G. H. WIDNER.
CHEMICAL FEEDING FILTER.
APPLICATION FILED MAY 20, 1916.

1,195,427.

Patented Aug. 22, 1916.

Inventor
George H. Widner
By Samuel Herrick,
Attorney

UNITED STATES PATENT OFFICE.

GEORGE H. WIDNER, OF DES MOINES, IOWA, ASSIGNOR TO DES MOINES REFINING COMPANY, OF DES MOINES, IOWA, A CORPORATION OF IOWA.

CHEMICAL-FEEDING FILTER.

1,195,427.     Specification of Letters Patent.     Patented Aug. 22, 1916.

Application filed May 20, 1916. Serial No. 98,992.

*To all whom it may concern:*

Be it known that I, GEORGE H. WIDNER, citizen of the United States, residing at 109 East Walnut street, Des Moines, in the county of Polk and State of Iowa, have invented certain new and useful Improvements in Chemical-Feeding Filters, of which the following is a specification.

This invention relates to filters and more particularly to chemical feeding filters.

It has heretofore been proposed to treat water for the purpose of softening the same by passing the water through a bed of zeolite like substance.

It is particularly the object of the present invention to provide a pressure filter which, while treating the water to soften it, will filter the water after it has been passed through the treating substance so that a clear filtered water is delivered from the filter.

The zeolite like substance that I prefer to employ is the substance known as refinite, though it is apparent that this filter may be used with any suitable water treating substance.

Figure 1:
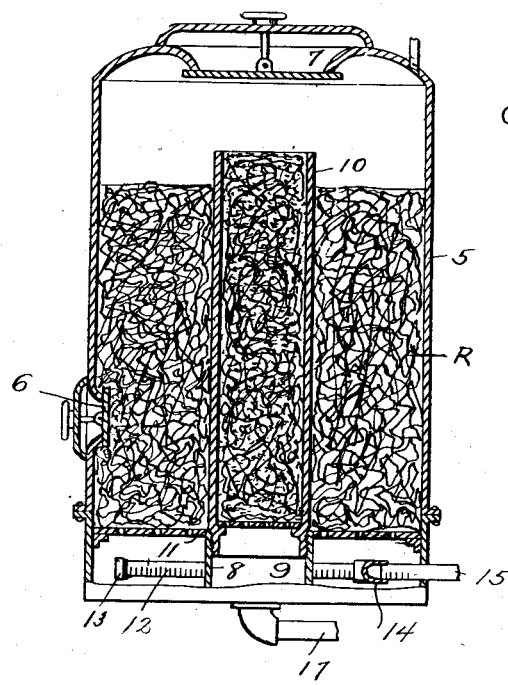
Figure 2:
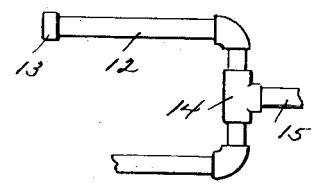

In the accompanying drawing: Figure 1 is a sectional view of a filter constructed in accordance with the invention and in accordance with what I term the upward type. Fig. 2 is a detail view of the water distributer hereinafter described.

Like numerals designate corresponding parts in all of the figures of the drawing.

Referring to the drawing it will be seen that the filter and softener comprises a receptacle 5 having man-hole openings 6 and 7. A ring 8 upstanding from the bottom of the receptacle 5 forms a filtered water chamber 9. Secured upon this ring is a tubular core support 10, said core being filled with filtering material F. The space R within the receptacle 5 and surrounding the core is to be filled with refinite or like zeolite-like substance. This refinite is supported upon a perforated plate 11 so that an intake chamber 12 is provided at the bottom of the receptacle 5. A water distributer D is disposed within the chamber 12 and consists of a U-shaped structure of pipe fittings the outer ends of the legs of which are closed by caps 13 and the bend of which is connected by a T 14 with a supply pipe 15. The pipes constituting this distributer are slotted or sawed transversely to provide a large number of orifices the area of which is one and one-half times the cross sectional area of the pipe 15. The filtering material F is supported upon a perforated plate 16 disposed at the juncture of core support 10 with ring 8. In this upward type of filter, the water enters through pipe 15, passes out of the orifices $15^a$ upwardly through the perforated plate 11 and through the body of refinite, where it is treated to soften it. It then passes downwardly through the tubular core support 10 and through the body of filtering material F and enters the filtered water chamber 9. A discharge pipe 17 leads from this filtered water chamber to any point at which it is desired to use the softened water. This may be to a boiler feed line or elsewhere. It is to be noted that the man-hole 7 is slightly larger than the core support 10. Consequently this core may be removed through this man-hole for the purpose of restoring or replenishing the filtering material. The man-hole 6 is conveniently located for cleaning the space R.

It is to be understood that the invention is not limited to the precise construction set forth, but that it includes within its purview such changes in form and location and proportions of the parts as fairly come within the spirit of the appended claims.

Having described my invention what I claim is:

1. A filter comprising a receptacle, a perforated plate spanning said receptacle and adapted to support a water softening mineral and a pipe construction disposed beneath said perforated plate and consisting of a plurality of connected horizontally disposed arms that are transversely slotted as and for the purpose set forth.

2. A filter comprising a receptacle, a perforated plate spanning said receptacle, a body of water softening material upon said plate, means for conducting water from said receptacle after it passes through the water softening material and a water distributer for supplying water gently to all portions of the underside of the perforated plate, said distributer comprising a plurality of horizontal and connected pipes which are transversely slotted across their sides that are disposed away from said perforated plate.

In testimony whereof I affix my signature in the presence of two witnesses.

GEORGE H. WIDNER.

Witnesses:
SAMUEL HERRICK,
F. G. CAMPBELL.

Copies of this patent may be obtained for five cents each, by addressing the "Commissioner of Patents, Washington, D. C."